(12) United States Patent
Wang et al.

(10) Patent No.: US 12,529,444 B2
(45) Date of Patent: Jan. 20, 2026

(54) SWITCHING APPARATUS AND CAMERA TRIPOD

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 240 days.

(21) Appl. No.: 18/521,202

(22) Filed: Nov. 28, 2023

(65) Prior Publication Data

US 2025/0122971 A1  Apr. 17, 2025

(30) Foreign Application Priority Data

Oct. 11, 2023 (CN) .......................... 202322747002.4

(51) Int. Cl.
*F16M 11/04* (2006.01)
*G03B 17/56* (2021.01)

(52) U.S. Cl.
CPC ......... *F16M 11/041* (2013.01); *G03B 17/561* (2013.01)

(58) Field of Classification Search
CPC ........................... G03B 17/566; F16M 11/041
See application file for complete search history.

(56) References Cited

U.S. PATENT DOCUMENTS

| | | | | |
|---|---|---|---|---|
| 7,217,045 B2* | 5/2007 | Jones | ............... | G08B 13/19632 |
| | | | | 348/E5.026 |
| 10,550,992 B2* | 2/2020 | Yun | ...................... | B60R 11/0241 |
| 11,454,341 B2* | 9/2022 | Liu | .......................... | F16G 15/06 |
| 11,525,470 B2* | 12/2022 | Richter | .................. | F16M 13/02 |
| 2012/0121248 A1* | 5/2012 | Shirono | ................. | G03B 17/14 |
| | | | | 359/619 |

* cited by examiner

*Primary Examiner* — Leon W Rhodes, Jr.
(74) *Attorney, Agent, or Firm* — Westbridge IP LLC

(57) ABSTRACT

Disclosed are a switching apparatus and a camera tripod. The switching apparatus includes: a connecting seat, a camera fixing seat, and a bracket fixing seat. An end surface of a first end of the connecting seat is provided with a connecting slot with a circular cross-section, and the rotating potion is provided with a sliding clamping slot along a circumferential direction of the connecting slot; the camera fixing seat includes a base, a camera fixing portion and a main body fixing portion respectively provided on a front side of the base and a back side of the base, the main body fixing portion is configured for inserting into the connecting slot, an outer peripheral surface of the main body fixing portion is provided with a clamping convex portion extending towards a peripheral surface of the main body fixing portion.

11 Claims, 16 Drawing Sheets

SWITCHING APPARATUS AND CAMERA TRIPOD

CROSS-REFERENCE TO RELATED APPLICATIONS

The present application claims priority to Chinese Patent Application No. 202322747002.4, filed on Oct. 11, 2023, the entire contents of which are incorporated herein by reference.

TECHNICAL FIELD

The present application relates to the technical field of switching apparatus, and in particular to a switching apparatus and a camera tripod.

BACKGROUND

In daily life, cameras are often configured to shoot in different scenes. Currently, the camera is locked and fixed through the assembly interface when shooting. When it needs to switch scenes to shoot, it takes to unscrew the fixing screws before assembling into another scene. The assembly of this kind of camera assembly interface is cumbersome, and the disassembly and assembly efficiency is low.

SUMMARY

The main purpose of the present application is to provide a switching apparatus, aiming at improving the efficiency of camera disassembly and assembly.

In order to achieve the above objective, the switching apparatus provided in the present application includes: a connecting seat, a camera fixing seat and a bracket fixing seat; an end surface of a first end of the connecting seat is provided with a connecting slot with a circular cross-section, part of a wall of the connecting slot protrudes toward a center of the connecting slot to form a rotating potion, and the rotating potion is provided with a sliding clamping slot along a circumferential direction of the connecting slot; the camera fixing seat includes a base, a camera fixing portion and a main body fixing portion respectively provided on a front side of the base and a back side of the base, the main body fixing portion is configured for inserting into the connecting slot, the camera fixing portion is configured to fix a camera, an outer peripheral surface of the main body fixing portion is provided with a clamping convex portion extending towards a peripheral surface of the main body fixing portion, after the main body fixing portion is inserted into the connecting slot, the camera fixing seat is rotated, and the clamping convex portion is configured to slide along the sliding clamping slot and is snapped in the rotating potion; and the bracket fixing seat is provided at a second end of the connecting seat.

In an embodiment, the switching apparatus further includes: a button, the button includes a button body and a confining convex portion, the confining convex portion is provided on the button body, and the button body is movably assembled on the connecting seat; after the clamping convex portion is configured to slide along the sliding clamping slot and is snapped in the rotating potion, the confining convex portion is movably snap-connected with the clamping convex portion to have a locking state and an unlocking state; in the locking state, the confining convex portion is snapped with the clamping convex portion to restrict the clamping convex portion from coming out; and in the unlocking state, the confining convex portion is separated from the clamping convex portion so that the clamping convex portion slides out of the sliding clamping slot.

In an embodiment, the clamping convex portion is provided with a confining groove, in response to that the clamping convex portion is configured to slide into the sliding clamping slot until the confining groove on the clamping convex portion is rotated to a position of the confining convex portion, the confining convex portion is snapped with the confining groove.

In an embodiment, the side wall of the confining convex portion facing a sliding opening of the sliding clamping slot is provided with a guiding inclined surface, and a cross-sectional area of the confining convex portion tapers in an upward direction along an axis of the connecting seat.

In an embodiment, the button further includes a sliding seat, the connecting seat includes a chassis and a cylindrical body with a sliding chamber; the chassis is provided with a mounting seat, and the sliding seat is provided on the mounting seat, and the cylindrical body is provided with an opening for assembling the button body; and after the chassis and the cylindrical body are covered, the sliding seat is snap-connected with the button body and is slidably accommodated in the sliding chamber.

In an embodiment, the sliding seat is provided with at least two elastic buckle arms, an end of each of the elastic buckle arms is provided with a barb, and a snap-fitted convex portion is provided at a back of the button body corresponding to the elastic buckle arm; and in response to that the button body is snap-connected to the sliding seat, the barb is snap-fitted to the snap-fitted convex portion.

In an embodiment, two elastic buckle arms are provided directly opposite to each other, and a first gap matched with a width of the snap-fitted convex portion is provided between the two elastic buckle arms; a second gap is provided at a middle of the snap-fitted convex portion, and the sliding seat is provided with a guiding block matched with the second gap; and in response to that the button body is connected to the sliding seat, the sliding seat is configured to slide in the sliding chamber to drive the two elastic buckle arms to move on both sides directly opposite to the snap-fitted convex portion, so that the snap-fitted convex portion enters the first gap, and the guiding block is driven to insert into the second gap.

In an embodiment, a snap-fitted notch is provided on a top side of the snap-fitted convex portion, and after the barb of the elastic buckle arm is snap-fitted with the snap-fitted convex portion, the barb of the elastic buckle arm is snap-fitted with the snap-fitted notch.

In an embodiment, the button further includes a reset member, and both ends of the reset member are respectively fixed to the mounting seat of the sliding seat and the connecting seat, so that the sliding seat has a tendency to move upward toward the axis direction of the connecting seat.

In an embodiment, the camera fixing seat and the connecting seat are respectively provided with a magnetic material, so that the camera fixing seat is configured to be magnetically connected to the connecting seat.

In an embodiment, the bracket fixing seat is provided with a threaded hole, and the threaded hole is configured to cooperate with a threaded column of the supporting member; or the bracket fixing seat includes a plurality of fixing arms provided at intervals to form a plugging channel between two adjacent fixing arms, and each of the fixing arms is provided with a corresponding fixing hole for a fastener to pass through; or the bracket fixing seat is provided with an elastic arm extending out of the connecting seat, and the elastic arm is configured to snap with a snapping portion of the supporting member.

The present application also provides a camera tripod, and the camera tripod includes the switching apparatus.

In the present application, when assembling the camera fixing seat, the main body fixing portion is inserted into the connecting slot, and the camera fixing seat is rotated clockwise, so that the clamping convex portion slides in and is snapped in the sliding clamping slot, and the camera fixing seat is quickly assembled to the connecting seat. The camera is assembled on the camera fixing portion of the camera fixing seat, and the bracket fixing seat can be connected to the supporting member of the camera tripod. When it needs to disassemble the camera from the supporting member of the camera tripod, the camera fixing seat can be rotated in the reverse direction to make the clamping convex portion exit the sliding clamping slot, and the camera and the camera fixing seat can be disassembled from the connecting seat. The rotational snap-connected method can improve the assembly and disassembly efficiency of the switching apparatus, thereby quickly disassembling and assembling the camera, and facilitate recording switching in different scenes.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
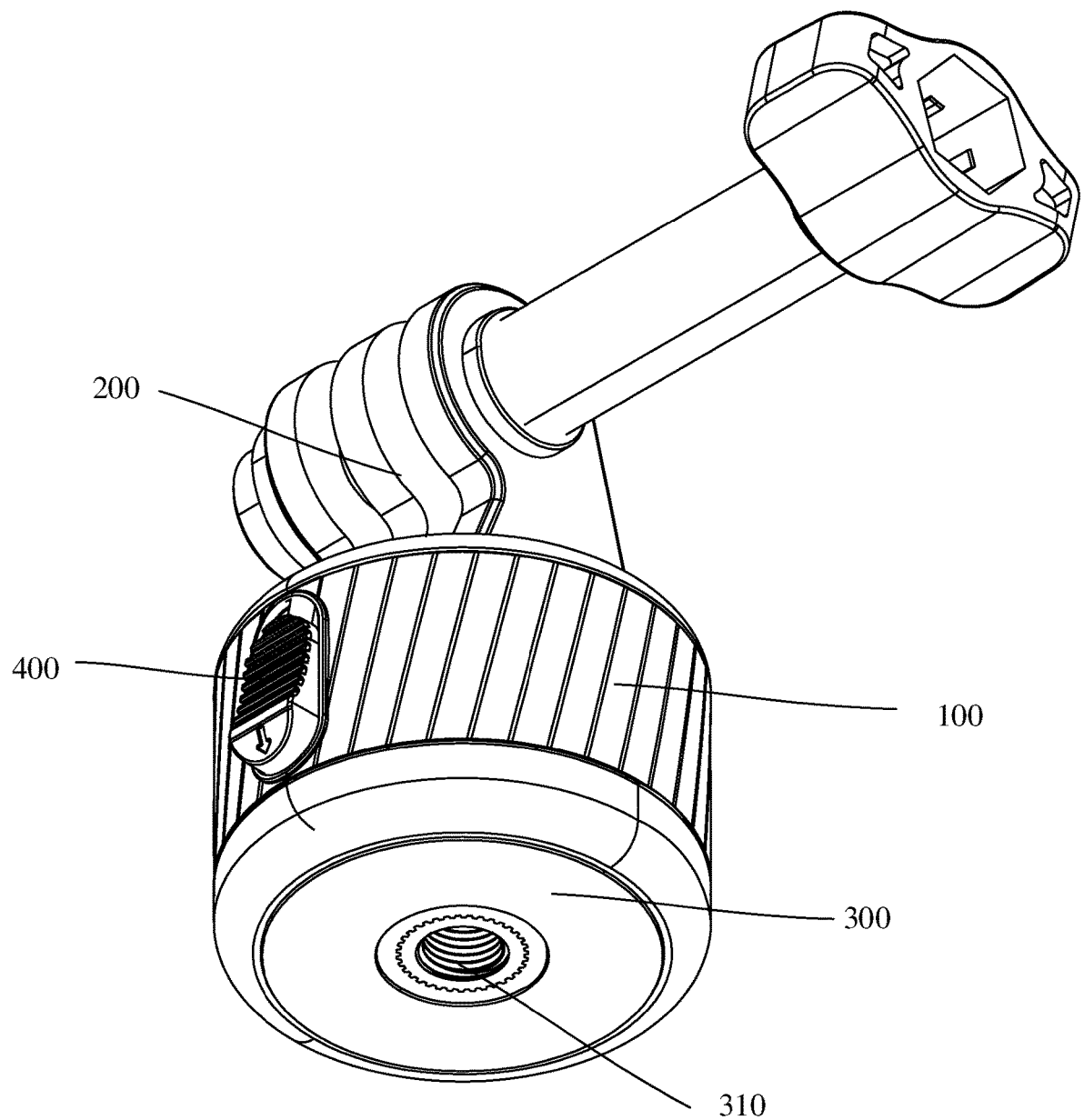
FIG. 1 is a schematic structural view of a switching apparatus according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In the description of the embodiments of the present application, unless otherwise explicitly stipulated and limited, the terms "connection" and "connected" should be understood in a broad sense. For example, it can be a fixed connection, a detachable connection or an integrated connection, a mechanical connection or an electrical connection, a direct connection or an indirect connection through an intermediate medium, a connection within two components or an interaction between two components, unless explicitly specified otherwise. For those skilled in the art, the specific meanings of the above terms in the embodiments of the present application can be understood in specific situations.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a switching apparatus.

Figure 3:
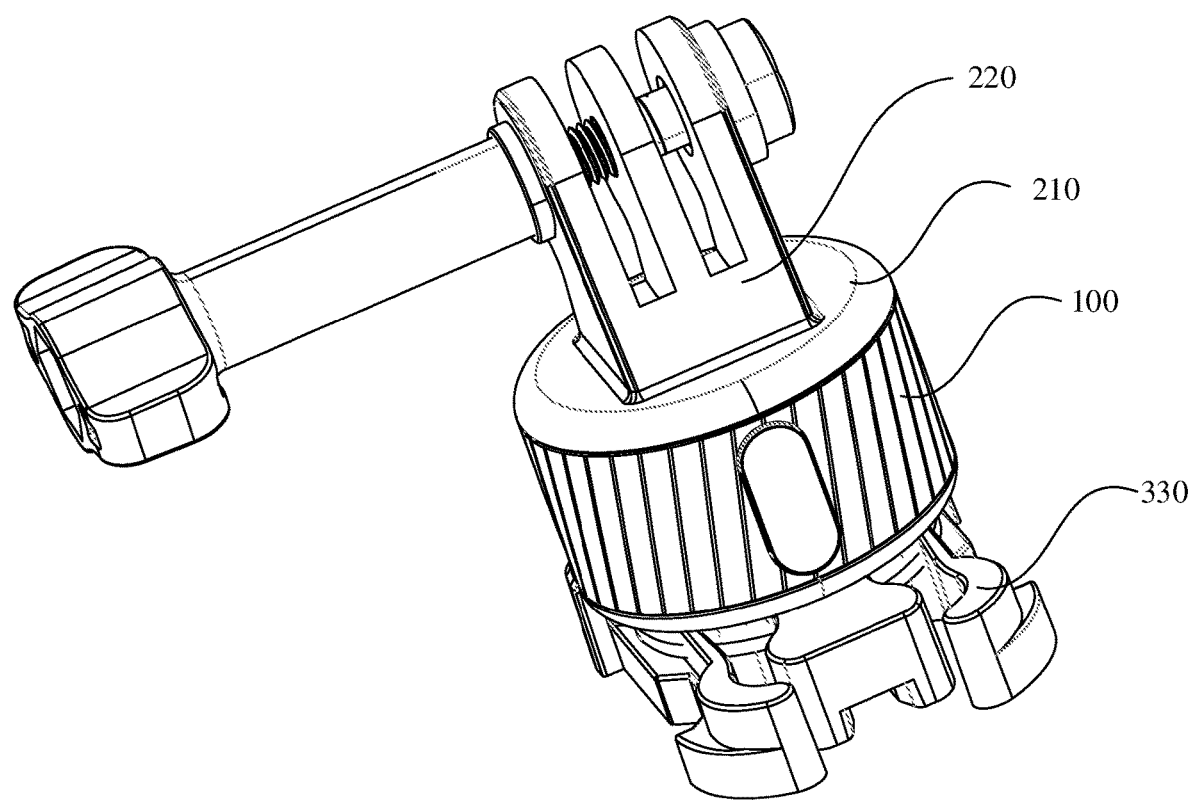
FIG. 3 is a schematic structural view of the switching apparatus according to an embodiment of the present application.
Figure 4:
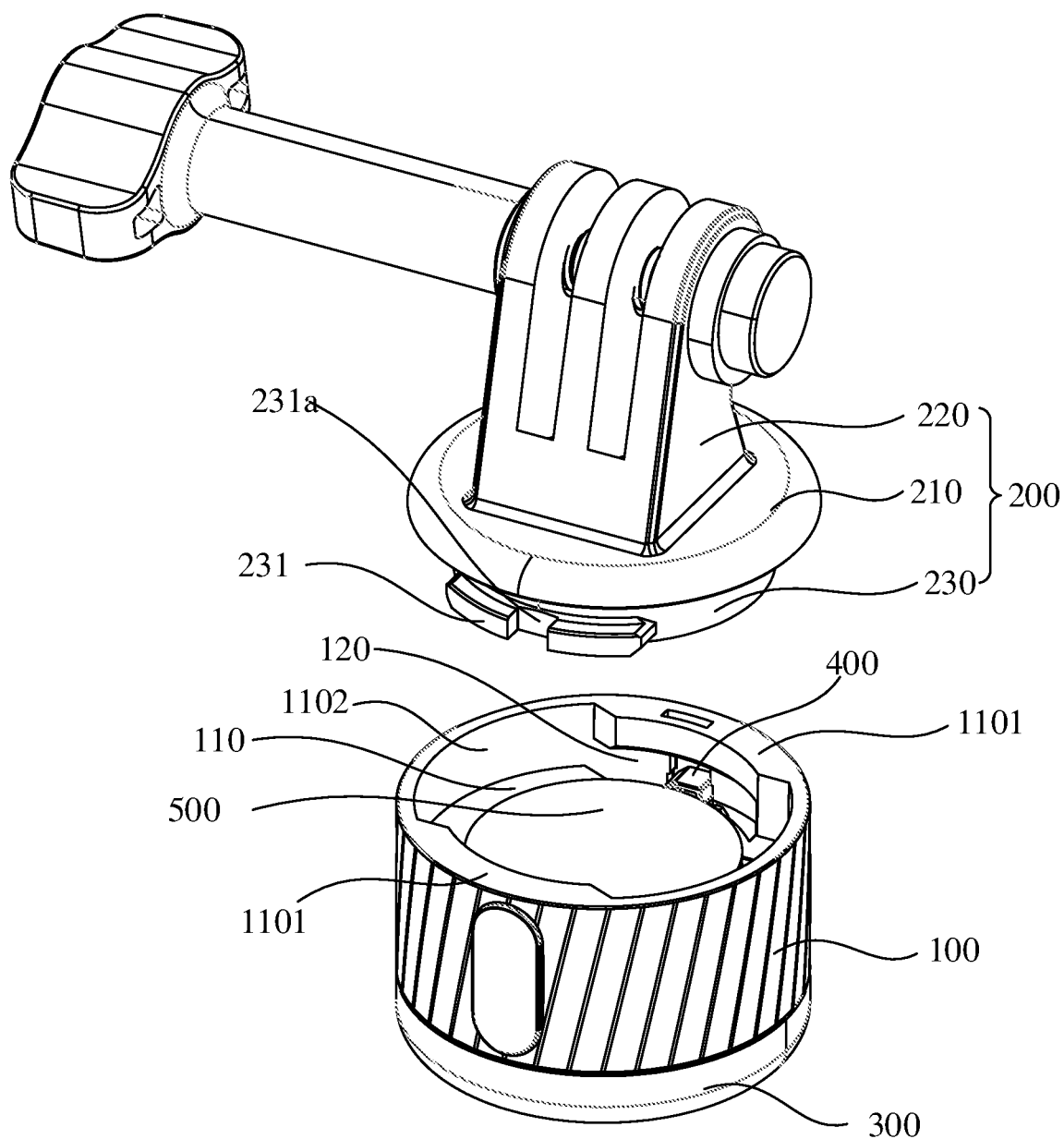
FIG. 4 is a schematic explosion view of a structure of the switching apparatus.

Referring to FIG. 3 and FIG. 4, in an embodiment of the present application, the switching apparatus includes a connecting seat 100, a camera fixing seat 200 and a bracket fixing seat 300. An end surface of a first end of the connecting seat 100 is provided with a connecting slot 110 having a circular cross-section. Part of a wall of the connecting slot 110 extends to a middle portion or a center direction of the connecting slot 110 to form a rotating potion 1101, the rotating potion 1101 is provided with a sliding clamping slot 120 along a circumferential direction of the connecting slot 110 of the connecting seat 100. The camera fixing seat 200 includes a base 210, a camera fixing portion 220 and a main body fixing portion 230 respectively provided on a front side of the base 210 and a back side of the base 210. The camera fixing portion 220 is configured to fix the camera. An outer peripheral surface of the main body fixing portion 230 is provided with a clamping convex portion 231 extending toward a peripheral surface of the main body fixing portion 230. The clamping convex portion 231 can slide to snap in the rotating potion along the sliding clamping slot 120. The bracket fixing seat 300 is provided at a second end of the connecting seat 100 to connect a supporting member of the camera tripod.

Figure 4A:
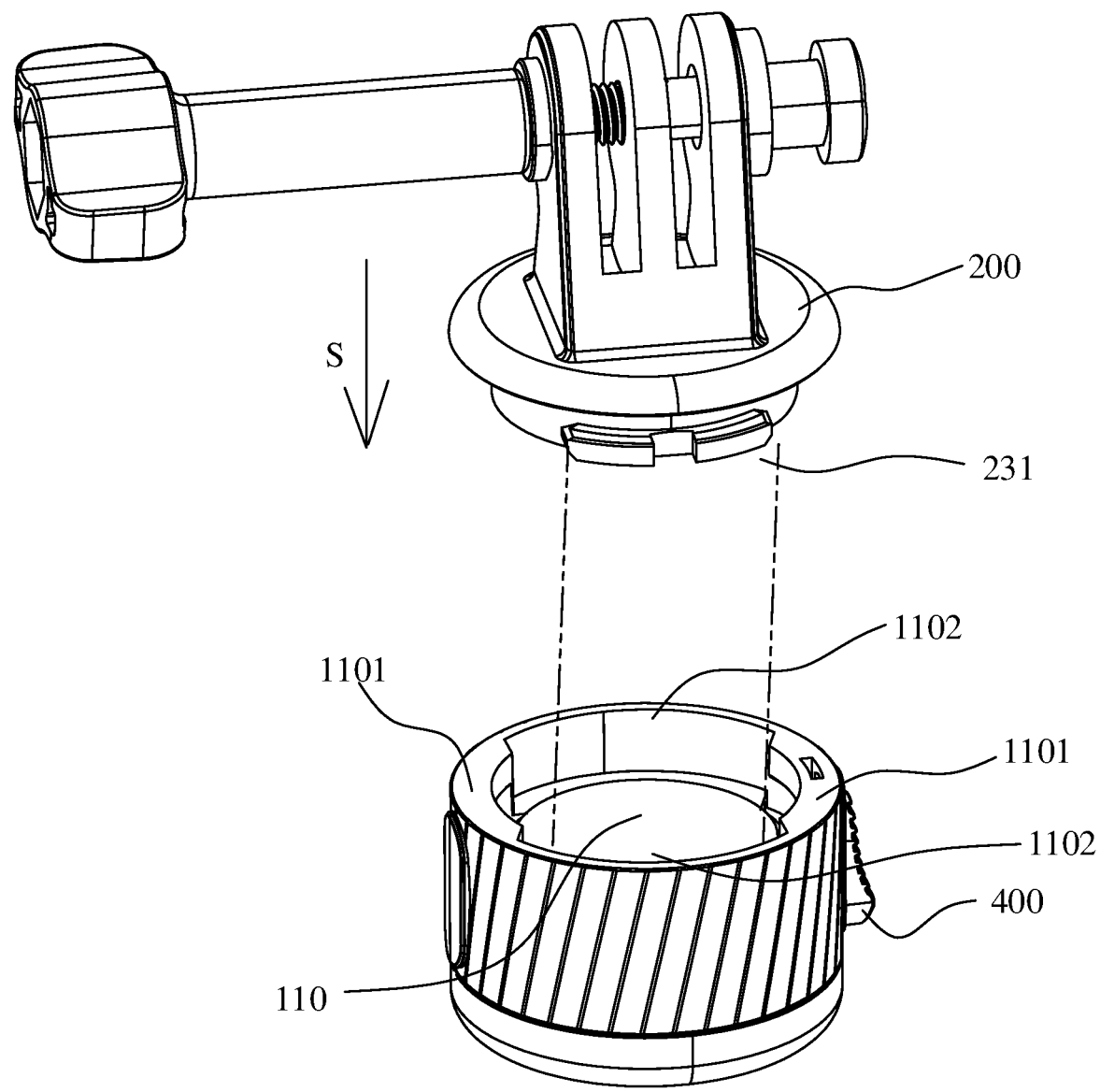
FIG. 4A and FIG. 4B are schematic views of a working principle of a camera fixing seat assembled on a connecting seat.
Figure 4B:
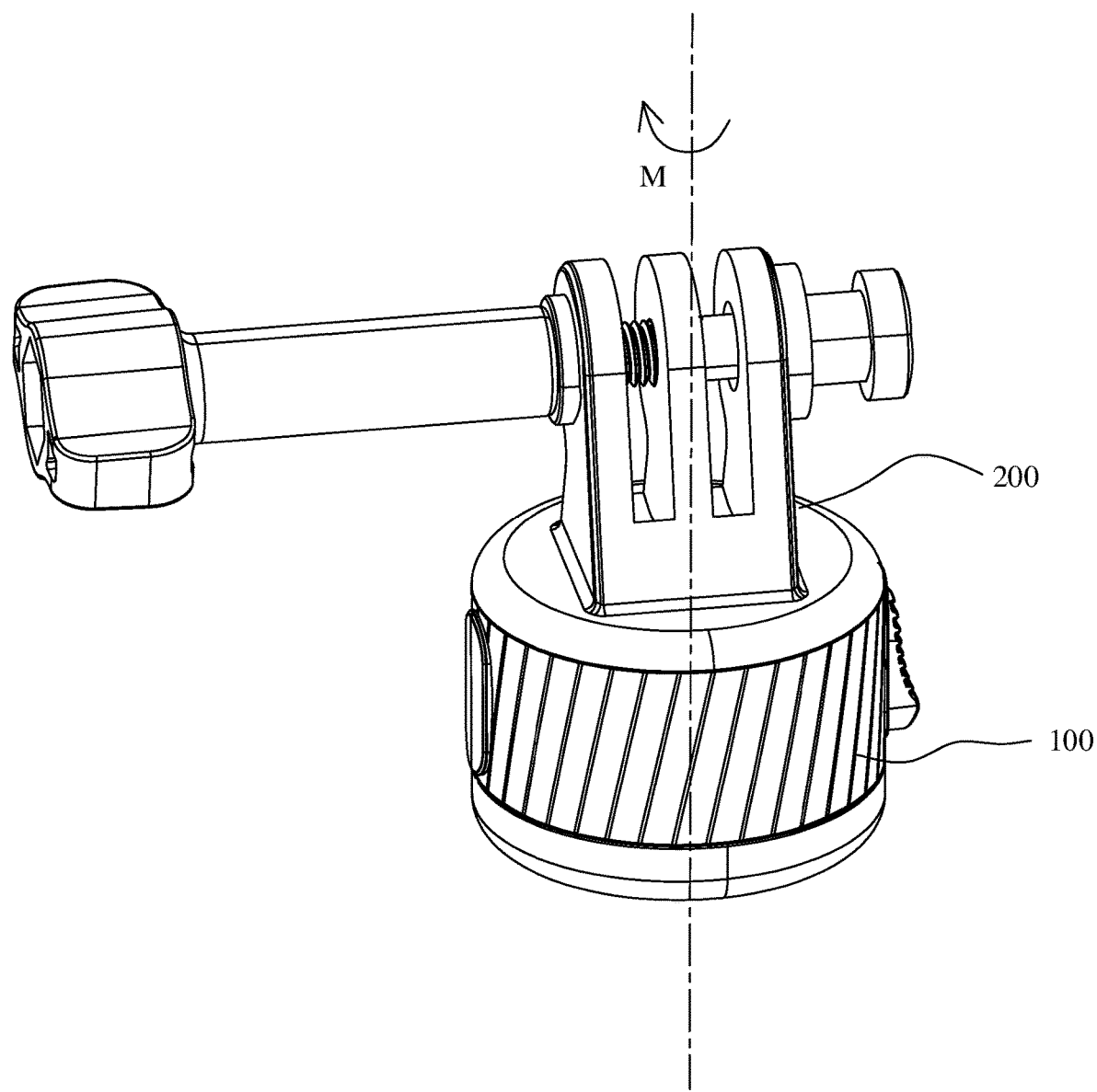

Specifically, the connecting slot 110 is divided into a rotating potion 1101 and a non-rotating potion 1102 in the circumferential direction. When it needs to assemble the camera fixing seat 200 on the connecting seat 100, as shown in FIG. 4A, the camera fixing seat 200 is made to be directly opposite to the connecting slot 110 of the connecting seat 100, the clamping convex portion 231 is made to be directly opposite to the non-rotating potion 1102 on the connecting slot 110, then the camera fixing seat 200 is assembled and made to move along the S direction to insert the clamping convex portion 231 into the connecting slot 110. At this time, in the connecting slot 110, the side wall of the clamping convex portion 231 is directly opposite to a notch of the clamping slot 120, so that the clamping convex portion 231 can be rotated to enter the sliding clamping slot 120. Finally, as shown in FIG. 4B, the camera fixing seat 200 is rotated along the M direction, that is, the clamping convex portion 231 is driven to rotate from the non-rotating potion 1102 to the rotating potion 1101, so that the clamping convex portion 231 enters the sliding clamping slot 120 of the rotating potion 1101 from the notch of the sliding clamping slot 120. Since an upper side wall of the sliding clamping slot 120 is provided in the notch of the connecting slot 110, it can block the clamping convex portion 231. Therefore, the clamping convex portion 231 can be abutted against the upper side wall to confine the clamping convex portion in the sliding clamping slot 120, and finally the camera fixing seat 200 is quickly assembled on the connecting seat 100. The camera is assembled on the camera fixing portion 220 of the camera fixing seat 200, and the bracket fixing seat 300 can be connected to the supporting member of the camera tripod. When it needs to disassemble the camera from the supporting member of the camera tripod, the camera fixing seat 200 is directly rotated in the reverse direction so that the clamping convex portion 231 exits the sliding clamping slot 120, and the camera and the camera fixing seat 200 can be disassembled from the connecting seat 100. This rotational snap-connected method improves the assembly and disassembly efficiency of the switching apparatus, which allows for the quick disassembly and assembly of the camera and is convenient for recording switching in different scenes.

Figure 5:
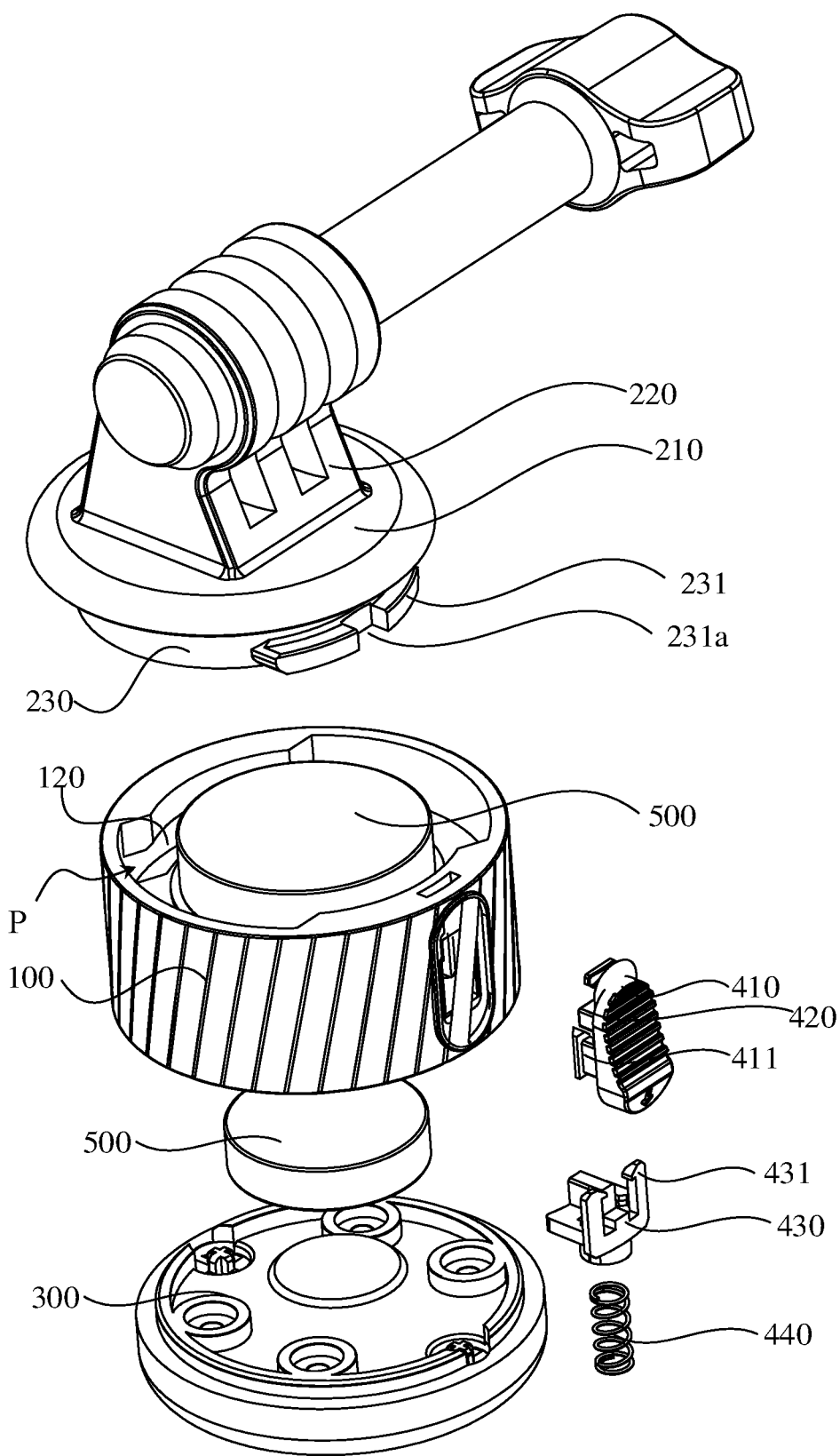
FIG. 5 is a schematic explosion view of the structure of the switching apparatus.
Figure 5A:
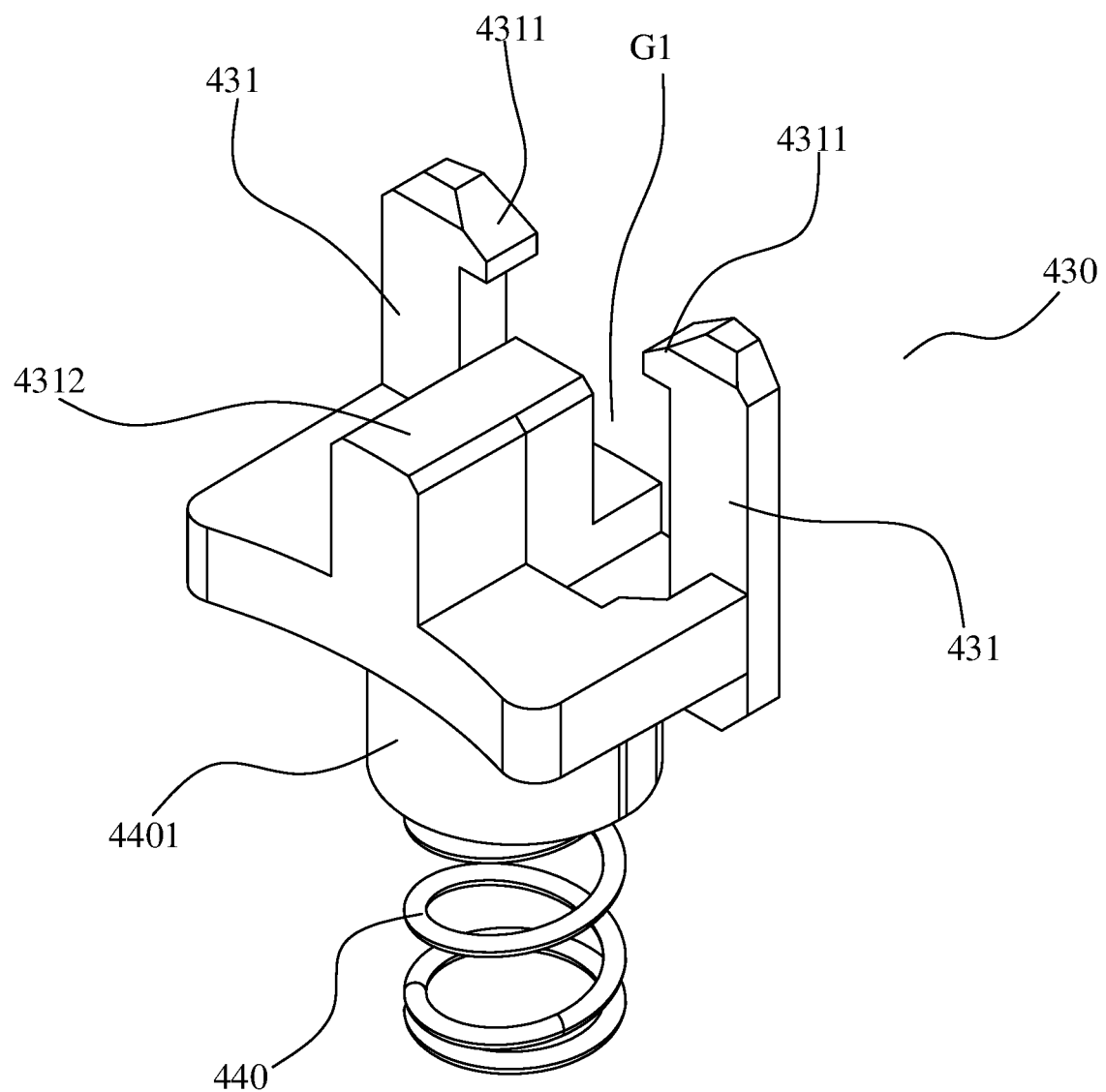
FIG. 5A is a schematic structural view of a sliding seat according to an embodiment of the present application.
Figure 5B:
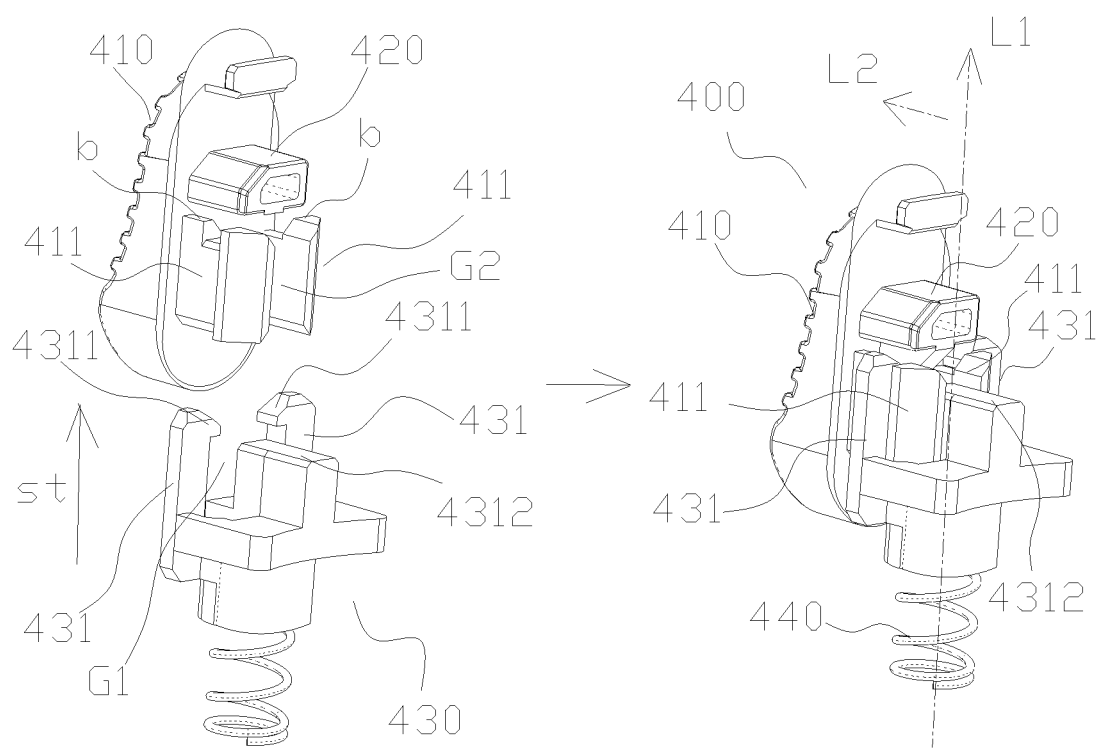
FIG. 5B is a schematic view of an assembly working principle of the sliding seat a button body of the button according to an embodiment of the present application.
Figure 5C:
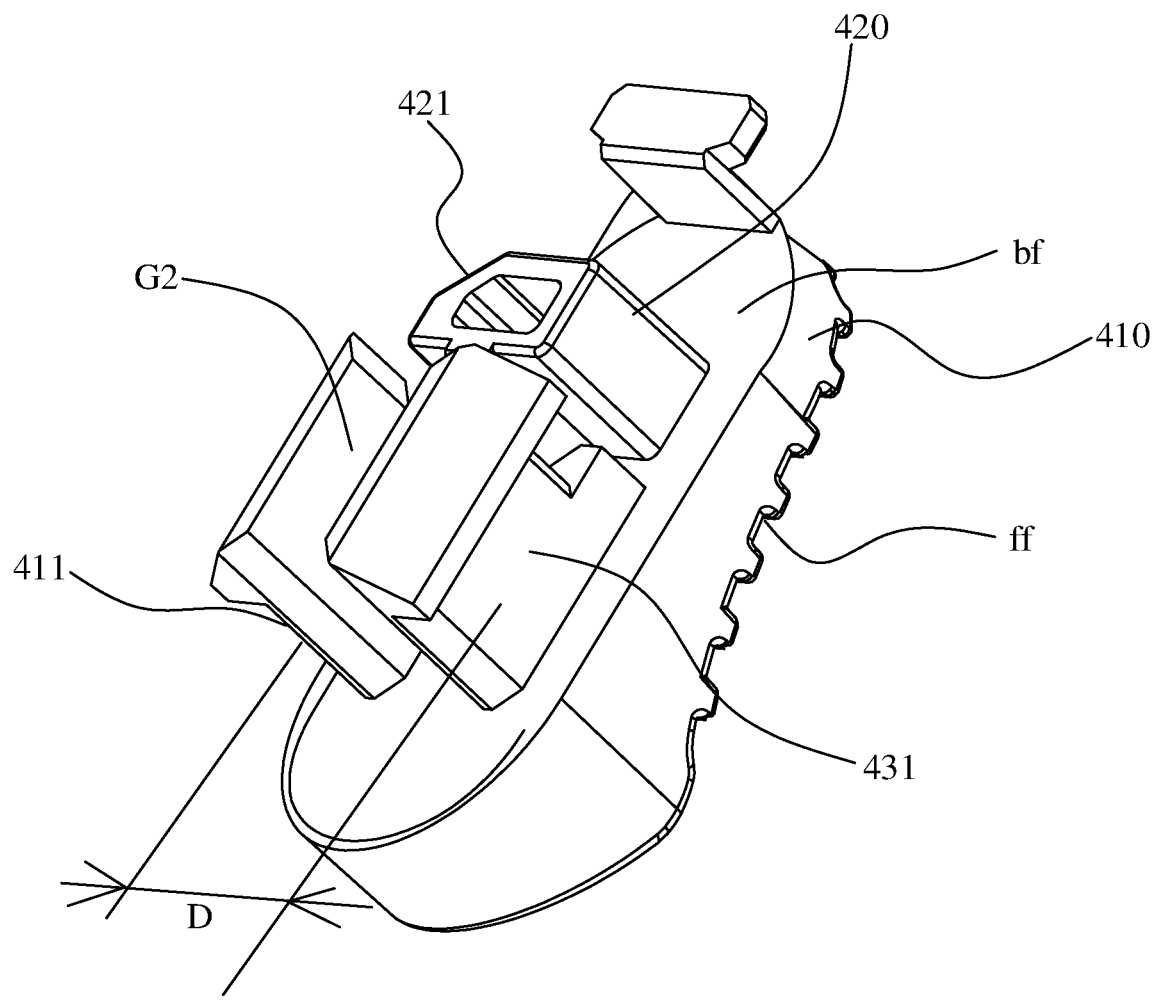
FIG. 5C is a schematic structural view of the button body according to an embodiment of the present application.

Referring to FIG. 4 and FIG. 5C, in an embodiment, the switching apparatus also includes a button 400. The button 400 includes a button body 410 and a confining convex portion 420. The confining convex portion 420 is provided on a back side bf of the button body 410 facing the inside of the connecting seat 100. The button body 410 is movably connected to the connecting seat 100, and a front side ff of the button body 410, that is, the button portion, is exposed outside the connecting seat 100 for the user to push or press. The confining convex portion 420 can be movably snap-connected with the clamping convex portion 231 to have a locking state and an unlocking state. In the locking state, the confining convex portion 420 is snapped with the clamping convex portion 231 to restrict the clamping convex portion 231 from coming out. In the unlocking state, the confining convex portion 420 is separated from the clamping convex portion 231 so that the clamping convex portion 231 can slide out of the sliding clamping slot 120.

Figure 2:
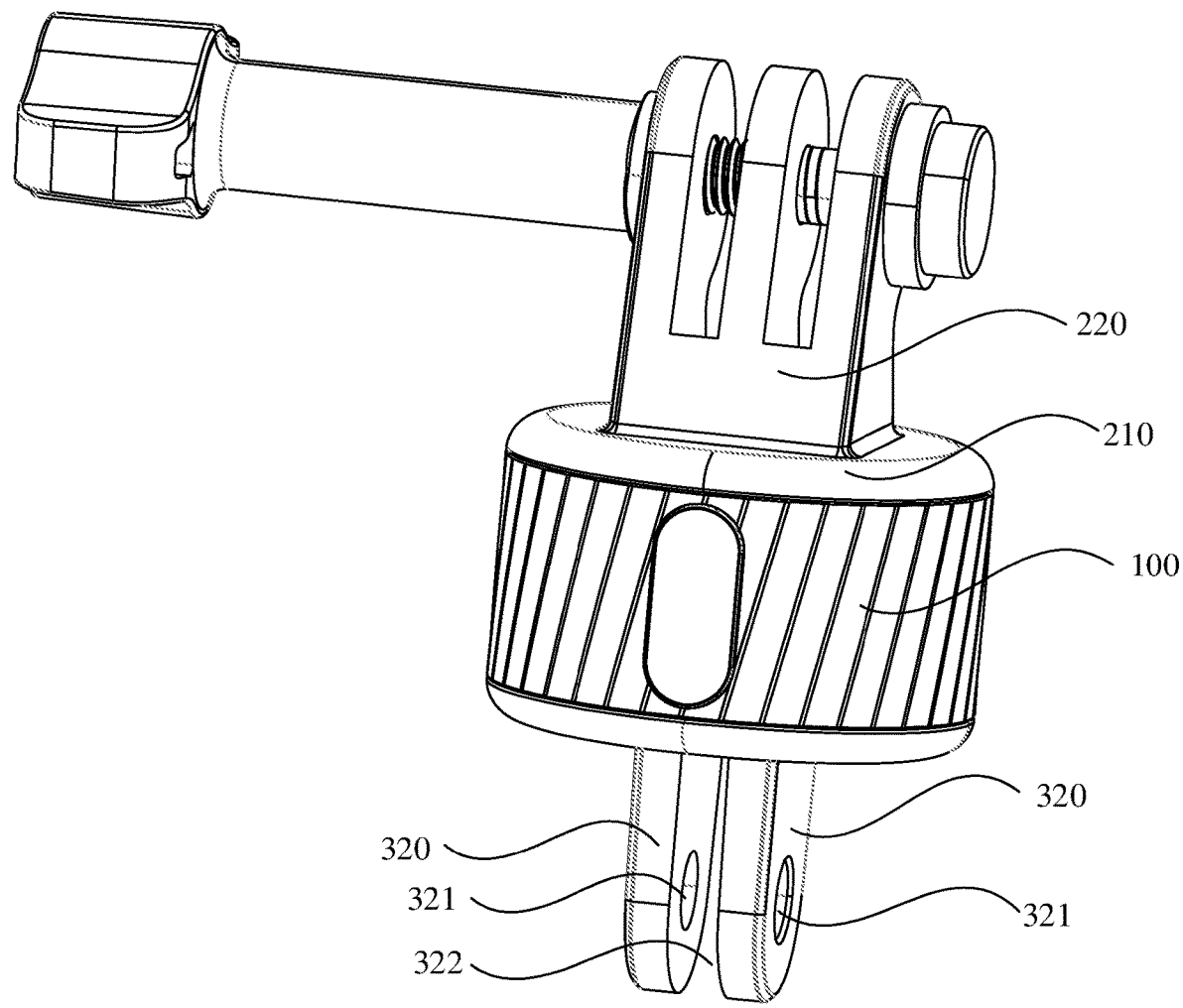
FIG. 2 is a schematic structural view of the switching apparatus according to an embodiment of the present application.
Figure 4C:
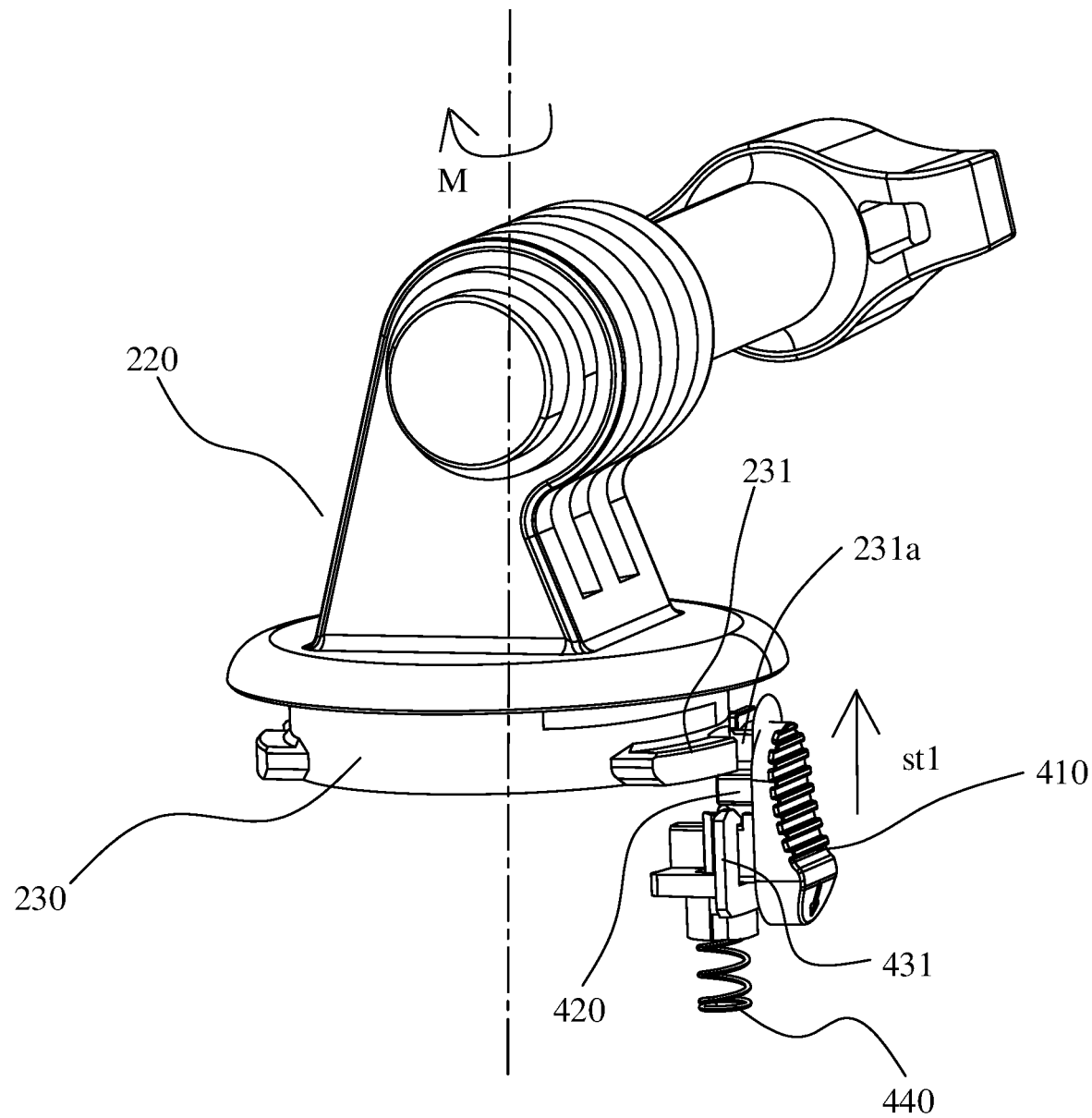
FIG. 4C is a schematic view of a working principle of a button moving to lock the camera fixing seat.

As shown in FIG. 2, when the camera fixing seat 200 is assembled on the connecting seat 100, in order to further fix the camera fixing seat 200 and prevent it from being accidentally rotated to separate the clamping convex portion 231 from the sliding clamping slot 120, when the clamping convex portion 231 rotates along the M direction to enter the sliding clamping slot 120, referring to FIG. 4C, since the button body 410 is movably connected to the connecting seat 100, that is, the button body 410 can move along the st1 direction, thereby driving the confining convex portion 420 to move and snap with the clamping convex portion 231 provided in the sliding clamping slot 120. A reset member 440 assembled at the bottom of button body 410 can also automatically push the button body 410 to move along the st1 direction. In an embodiment, as shown in FIG. 4, a confining groove 231a can be provided at a middle part of the clamping convex portion 231. When the clamping convex portion 231 rotates along the M direction and enters the sliding clamping slot 120, and is directly opposite to the confining groove 231a and the confining convex portion 420, the button body 410 is pushed into the button body 410 by the reset member 440 or manually to snap. That is, more specifically, the button 400 also includes the reset member 440. Two ends of the reset member 440 are fixed to the sliding seat 430 and the connecting seat 100 respectively, so that the sliding seat 430 has a tendency to move upward toward an axis of the connecting seat 100. It can be understood that after the button body 410 is forced to move downward in the axis direction of the connecting seat 100, when the force is canceled, the button body 410 will drive the confining convex portion 420 to move upward in the axis direction of the connecting seat 100, so that the confining convex portion 420 is snapped with the clamping convex portion 231. Under the action of the reset member 440, there will be an upward force toward the axis direction of the connecting seat 100, which will increase the stability of the snap between the confining convex portion 420 and the clamping convex portion 231. Of course, the preset application is not limited to this. In other embodiments, the button 400 may not be provided with the reset member 440. When it needs to separate the confining convex portion 420 from the clamping convex portion 231, the button body 410 is manually controlled to move downward toward the axis direction of the connecting seat 100. When it needs to snap the confining convex portion 420 with the clamping convex portion 231, the button body 410 is manually controlled to move upward toward the axis direction of the connecting seat 100, so that the confining convex portion 420 is snapped with the clamping convex portion 231.

In an embodiment, the reset member 440 may be a spring or an elastic piece.

Specifically, when assembling the camera fixing seat 200, the main body fixing portion 230 is inserted into the connecting slot 110, and the camera fixing seat 200 is rotated clockwise, so that the clamping convex portion 231 slides and is snapped in the sliding clamping slot 120, then the confining convex portion 420 of the button 400 is snapped with the clamping convex portion 231 to prevent the clamping convex portion 231 from sliding out of the sliding clamping slot 120. The sliding clamping slot 120 and the confining convex portion 420 cooperatively confine the circumferential direction and the axial direction of the clamping convex portion 231, thereby increasing the stability of the snapped connection of the clamping convex portion 231, and increasing the connection stability between the camera fixing seat 200 and the connecting seat 100. When disassembling the camera fixing seat 200, the button body 410 is moved to separate the confining convex portion 420 from the clamping convex portion 231, then the camera fixing seat 200 is rotated counterclockwise to slide the clamping convex portion 231 out of the sliding clamping slot 120. Finally, the camera fixing member is pulled away from the connecting seat 100 to complete the disassembly. It can be seen that the assembly and disassembly procedures of the camera fixing seat 200 are simple, which is convenient for improving the assembly and disassembly efficiency of the switching apparatus. This can quickly disassemble and assemble the camera, which is convenient to switch recording in different scenes.

It should be noted that in this embodiment, the sliding opening of the sliding clamping slot 120 is provided in the clockwise direction of the circumferential direction of the sliding clamping slot 120. Therefore, when the camera fixing seat 200 is rotated clockwise, the clamping convex portion 231 can slide into the sliding clamping slot 120, and when the camera fixing seat 200 is rotated counterclockwise, the clamping convex portion 231 can slide out of the sliding clamping slot 120. Of course, the application is not limited to this. In an embodiment, the sliding opening of the sliding clamping slot 120 is provided in the counterclockwise direction of the circumferential direction of the sliding clamping slot 120. It needs to rotate counterclockwise to slide the clamping convex portion 231 into the sliding clamping slot 120, and to rotate clockwise to slide the clamping convex portion 231 out of the sliding clamping slot 120. Of course, the application is not limited to this. In an embodiment, when the sliding clamping slot 120 is a through slot, the clamping convex portion 231 can slide into the sliding clamping slot 120 clockwise or counterclockwise.

Furthermore, in this embodiment, a confining wall is provided at an end of the sliding direction of the clamping slot 120, which can confine the end position of the clamping convex portion 231 and prevent the clamping convex portion 231 from sliding out of the sliding clamping slot 120 from the end of the sliding clamping slot 120 in the sliding direction. Of course, the application is not limited to this. In other embodiments, the sliding clamping slot 120 can also be a through slot.

Figure 5D:
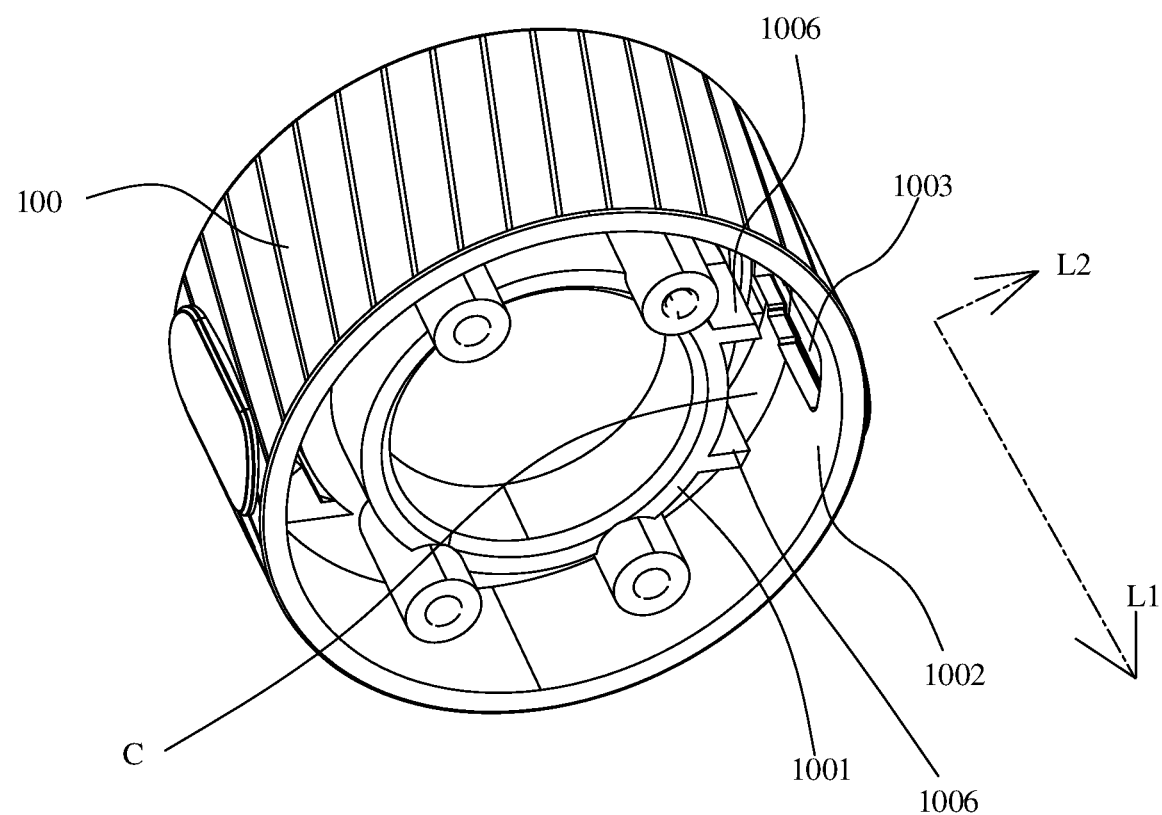
FIG. 5D is a schematic internal structural view of the connecting seat according to an embodiment of the present application.

In an embodiment, referring to FIG. 5D, the button 400 includes a sliding seat 430. A sliding chamber C is provided in the connecting seat 100, the button body 410 is detachably connected to the sliding seat 430, and the opposite sides of the sliding seat 430 are respectively in contact and moveable with the opposite walls of the sliding chamber C. It can be understood that in this way, the lateral displacement of the sliding seat 430 can be limited and the sliding seat is prevented from shifting when moving along the connecting seat axis, which will cause the sliding seat 430 and the button body 410 to shift, and ultimately cause the confining convex portion 420 to shift sideways, making the confining convex portion 420 unable to snap with the confining groove 231a.

Figure 5E:
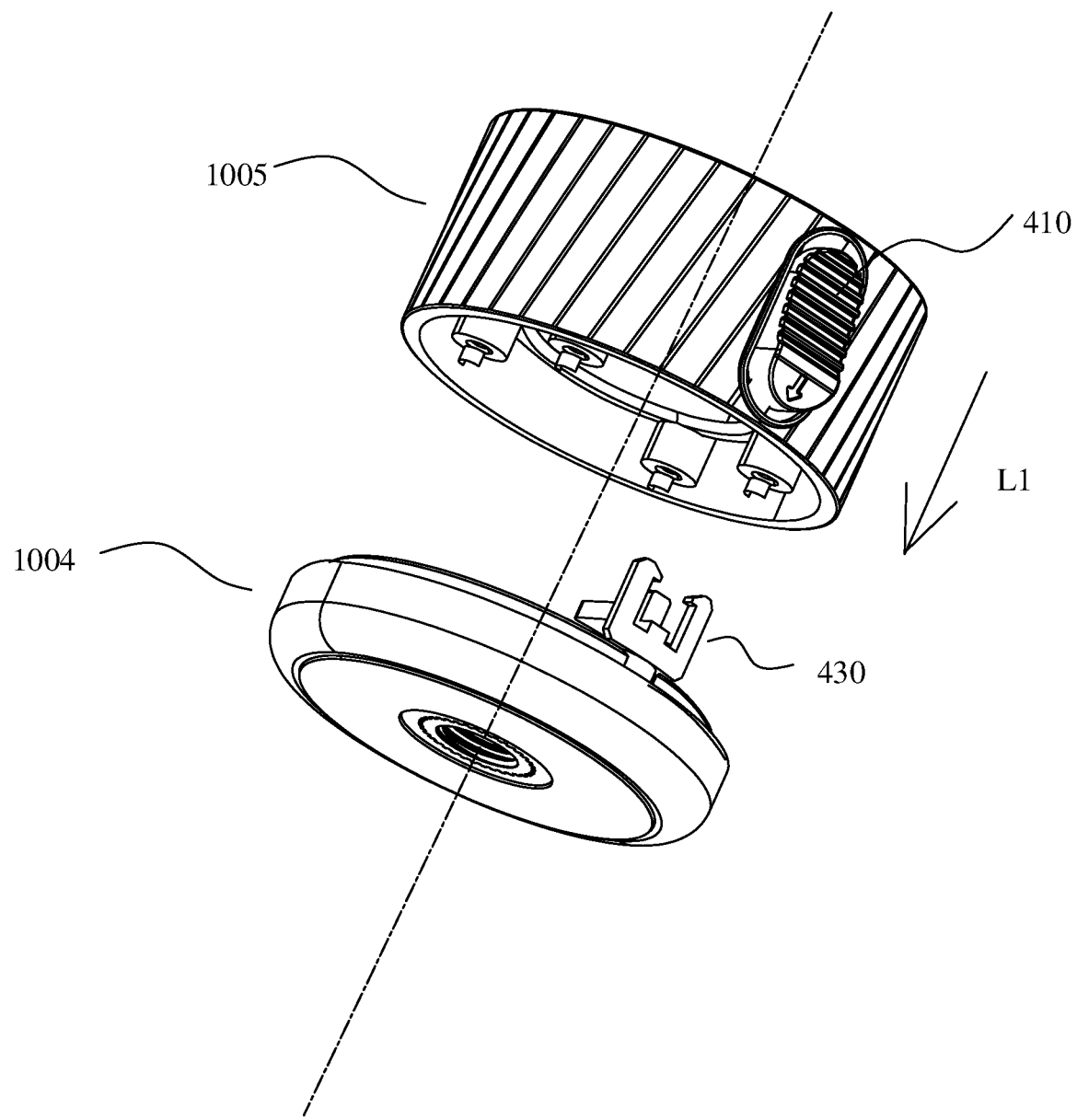
FIG. 5E is a schematic view of an assembly principle of the connecting seat according to an embodiment of the present application.

Regarding the structure of the connecting seat 100, in an embodiment, referring to FIG. 5D and FIG. 5E, the connecting seat 100 includes a cylindrical body 1005 with a hollow cavity of a circular cross-section and a chassis 1004 for assembly and fixation at the bottom of the cylindrical body 1005, that is, the chassis 1004 is assembled and fixed at a second end of the connecting seat 100, and the bracket fixing seat is assembled on the chassis 1004. During production and assembly, the chassis 1004 is fixed on the second end of the connecting seat 100 or the bottom of the cylindrical body 1005 with screws or glue to complete the assembly of the connecting seat 100, and the port of the hollow cavity provided at the first end of the cylindrical body 1005 is formed with the connecting slot 110. Referring to FIG. 5D, the center of the cylindrical body 1005 below the connecting slot 100 is provided with a cylinder 1001 connected to the inner wall of the hollow cavity. Two spaced-apart blocks 1006 are distributed around the outer circumference of the cylinder 1001. The space enclosed by the two blocks 1006 is directly opposite to the opening 1003 of the button body 410. In this way, part of the outer peripheral wall of the cylinder 1001, the side walls of the two blocks 1006 and part of the inner wall of the cylindrical body 1005 together form the sliding chamber C. The button 400 slides in the sliding chamber C, that is, along the axis of the cylindrical body 1005. The confining convex portion 420 of the button body 410 is driven to slide, so that it can move away from or approach the clamping convex portion 231 to release or snap-connect.

In an embodiment, the button body 410 is snap-connected to the sliding seat 430, which is because the snap-on connection is easy to assembly and can be assembled without tools. There is no need to use additional materials such as fastener screws during the production and assembly process, so the buckle costs low. The assembly process of the buckle is very simple. Generally, it only requires one pushing action. There is no need for rotational movement or product positioning work before assembly, which is quick and simple, and can improve the efficiency of the assembly of the button body 410 and the sliding seat 430.

In an embodiment, the sliding seat 430 is provided with an elastic buckle arm 431, the button body 410 is provided with a snap-fitted convex portion 411 corresponding to the elastic buckle arm 431, and the elastic buckle arm 431 is snap-fitted with the snap-fitted convex portion 411. The buckle structure is simple and easy to assembly. Of course, the application is not limited to this. In other embodiments, the sliding seat 430 may also be provided with a buckle, the button body 410 is provided with a button hole corresponding to the elastic buckle arm 431, and the buckle is snapped with the button hole.

In an embodiment, referring to FIG. 5, FIG. 5A and FIG. 5B, the sliding seat 430 is provided with at least two elastic buckle arms 431, each of the elastic buckle arms 431 is provided with a barb 4311 at the end, and the top outer surface of the barb 4311 is an inclined surface, the back bf of the button body 410 is provided with the snap-fitted convex portion 411 corresponding to the elastic buckle arm 431. When the body 410 and the sliding seat 430 are connected, the barb 4311 of the elastic buckle arm 431 hooks the snap-fitted convex portion 411 and are connected together. The connection process is as shown in FIG. 5B, when the connecting button body 410 is connected to the sliding seat 430, the sliding seat 430 slides along the st direction in the sliding chamber C to the position where the barb 4311 touches the snap-fitted convex portion 411, then the barb 4311 of the elastic buckle arm 431 is abutted against the two side walls of the clamping convex portion 411. When the sliding seat 430 continues to slide along the st direction, the elastic buckle arm 431 is stretched by the outer side walls of the snap-fitted convex portion 411 and temporarily deformed elastically until the sliding seat 430 slides to a position where the barb 4311 is no longer in contact with the snap-fitted convex portion 411. That is, when the elastic buckle arm 431 passes through the snap-fitted convex portion 411, the barb 4311 is provided at the end surface b of the snap-fitted convex portion 411, the elastic buckle arm 431 is no longer abutted against the snap-fitted convex portion 411, the elastic deformation of the elastic buckle arm 431 disappears, the elastic buckle arm 431 is reset, and the barb 4311 at the end of the elastic buckle arm 431 hooks the end surface b of the snap-fitted convex portion 411, so that the elastic buckle arm 431 is snap-fitted with the snap-fitted convex portion 411. In an embodiment, the top end surface b of the snap-fitted convex portion 411 is provided with the snap-fitted notch, and the barb 4311 of the elastic buckle arm 431 is snap-fitted to the snap-fitted notch. It can be understood that this can make the snap-fitting of the snap-fitted convex portion 411 and the elastic buckle arm 431 more stable. Of course, the application is not limited to this. In other embodiments, the snap-fitted notch may not be provided, and the elastic buckle arm 431 is directly snap-fitted to the top side of the snap-fitted convex portion 411.

In an embodiment, as shown in FIG. 5A and FIG. 5C, two elastic buckle arms 431 are provided. The two elastic buckle arms 431 are directly opposite to each other, and the two barbs 4311 are also directly opposite to each other. A first gap G1 matching the width D of the snap-fitted convex portion 411 is provided between the two elastic buckle arms 431. A second gap G2 is provided in the middle of the snap-fitted convex portion 411, and the sliding seat 430 is also provided with a guiding block 4312 matching the second gap G2.

As shown in FIG. 5B and FIG. 5C, when the button body 410 is assembled and connected with the sliding seat 430, the sliding seat 430 slides in the sliding chamber C to drive the two elastic buckle arms 431 to move on both sides directly opposite to the snap-fitted convex portion 411. That is, the first gap G1 between the two elastic buckle arms 431 cooperates with the two side walls of the snap-fitted convex portion 411 in the width D direction of the snap-fitted convex portion 411, so that the snap-fitted convex portion 411 enters the first gap G1, and at the same time drives the guiding block 4312 insert into the second gap G2. When mass rapid produced and assembled, during the process of assembling and connecting the sliding seat 430 and the button body 410, the elastic buckle arm 431 of the sliding seat 430 needs to be connected with the snap-fitted convex portion 411 of the button body 410. The elastic buckle arm 431 is required to elastically deform, and the stiffness of the elastic buckle arm 431 is often relatively small. If there is no guidance and reinforcement of the guiding block 4312, the elastic deformation will cause a deflection or a breakage during the rapid assembly of the assembly line, and it is easy to produce defective products. Through the matching design of the guiding block 4312 and the second gap G2, when the two elastic buckle arms 431 elastically deformed moves on both sides directly opposite to the snap-fitted convex portion 411, the guiding block 4312 can guide and position on the one hand, and reinforce on the other hand to make the movement more stable. In addition, the disassemble and the assemble of the button body 410 and the sliding seat 430 of the present application also has the following effects.

Referring to the right picture of FIG. 5B, when the button body 410 is assembled to the sliding seat 430, an overall structure is similar to an "L" shape, that is, the overall structure has a structure extending in the L1 direction and a structure extending in the L2 direction. It is determined by the overall function of the button body 410 and the sliding seat 430, that is, the entirety of the button body 410 and the sliding seat 430 is required to slide along the L1 direction in the sliding chamber C, and the front ff of the pressing part of button body 410 is required to pass through the opening 1003 of connecting seat 100 to extend outward to be exposed on the connecting seat 100 for user operation, that is, the front ff of the pressing part of button body 410 extends along the L2 direction for operation and pressing to control the sliding. In production and manufacturing, it's known that in the process of the streamlined rapid large-scale assembly, the single linear direction equipment is relatively simple and efficient. If not detachable, the button body 410 and sliding seat 430 can not be assembled into the sliding chamber C from the L1 direction or the L2 direction due to the "L" shaped structure of the button. In the present application, the connecting seat 100 is divided into a cylindrical body 1005 and a chassis 1004, and the button body 410 and the sliding seat 430 are buckle assembly structures, thus the problem is overcome. The assembly steps and principles are as follows.

Figure 5F:
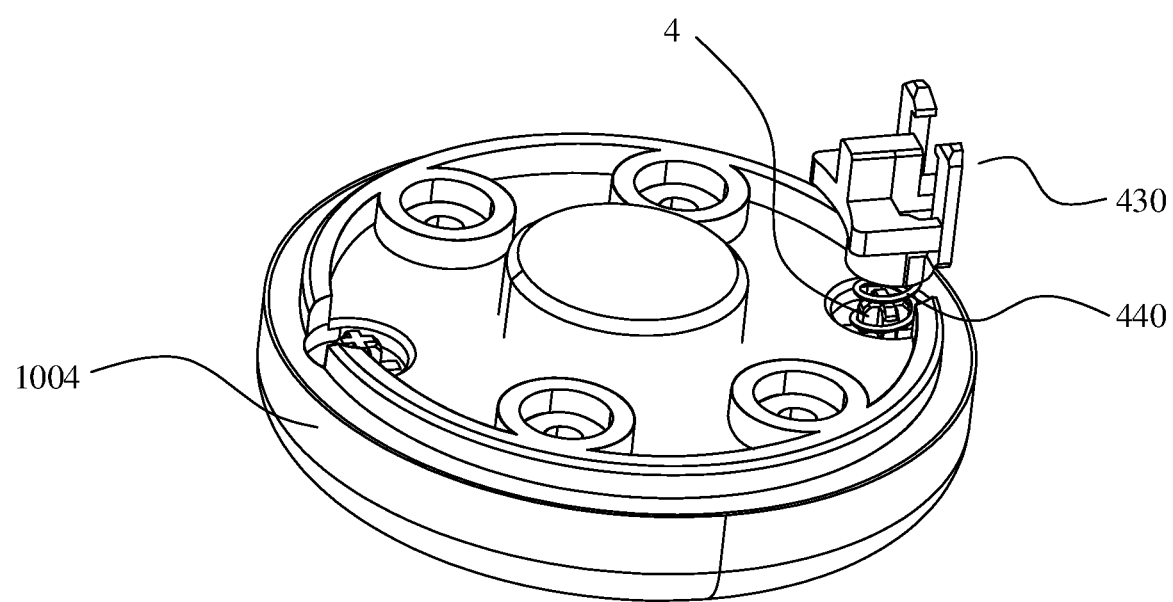
FIG. 5F is a schematic view of a connection between the mounting seat and the sliding seat according to an embodiment of the present application.
Figure 6:
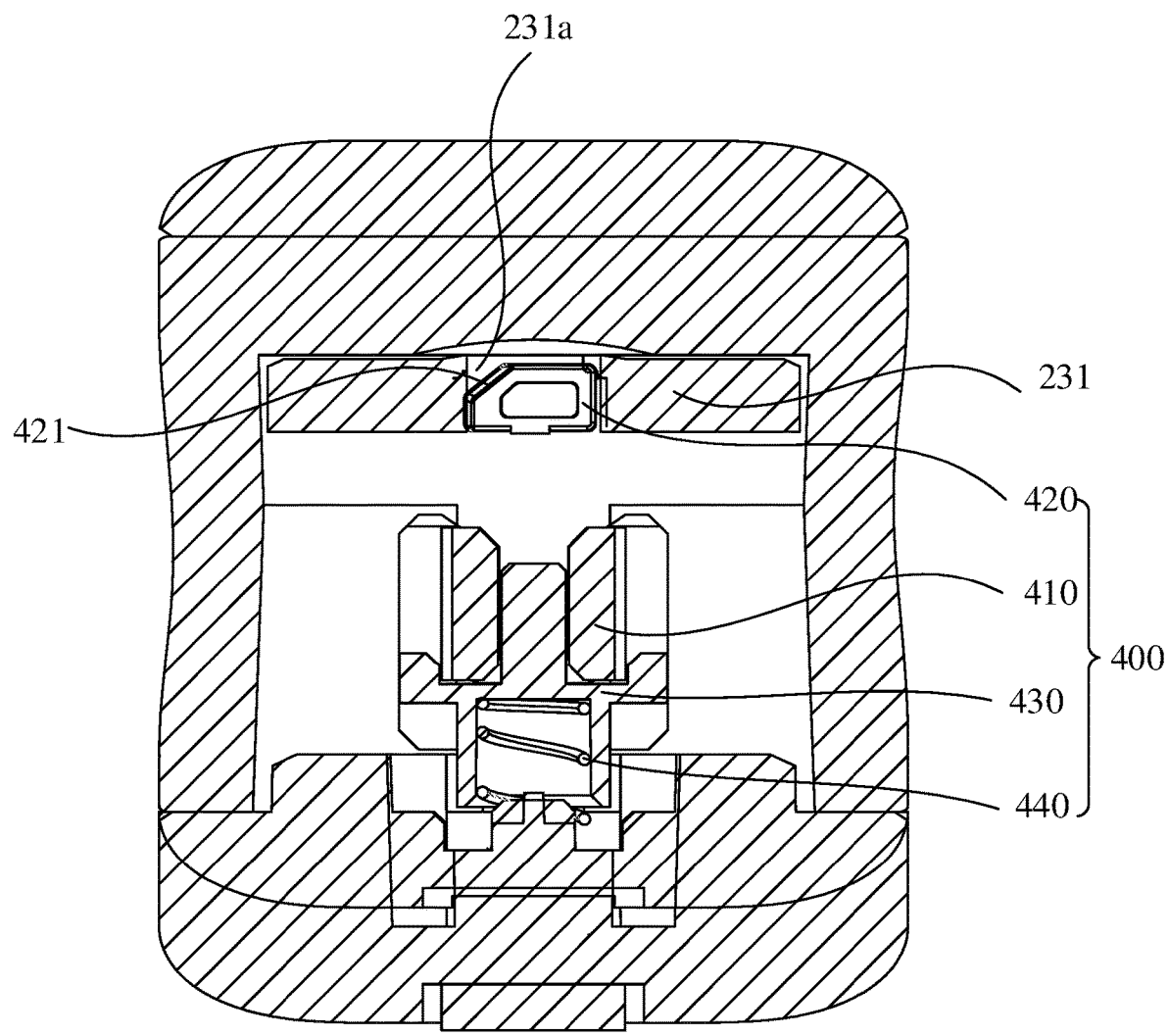
FIG. 6 is a schematic cross-sectional structural view of the switching apparatus.
Figure 7:
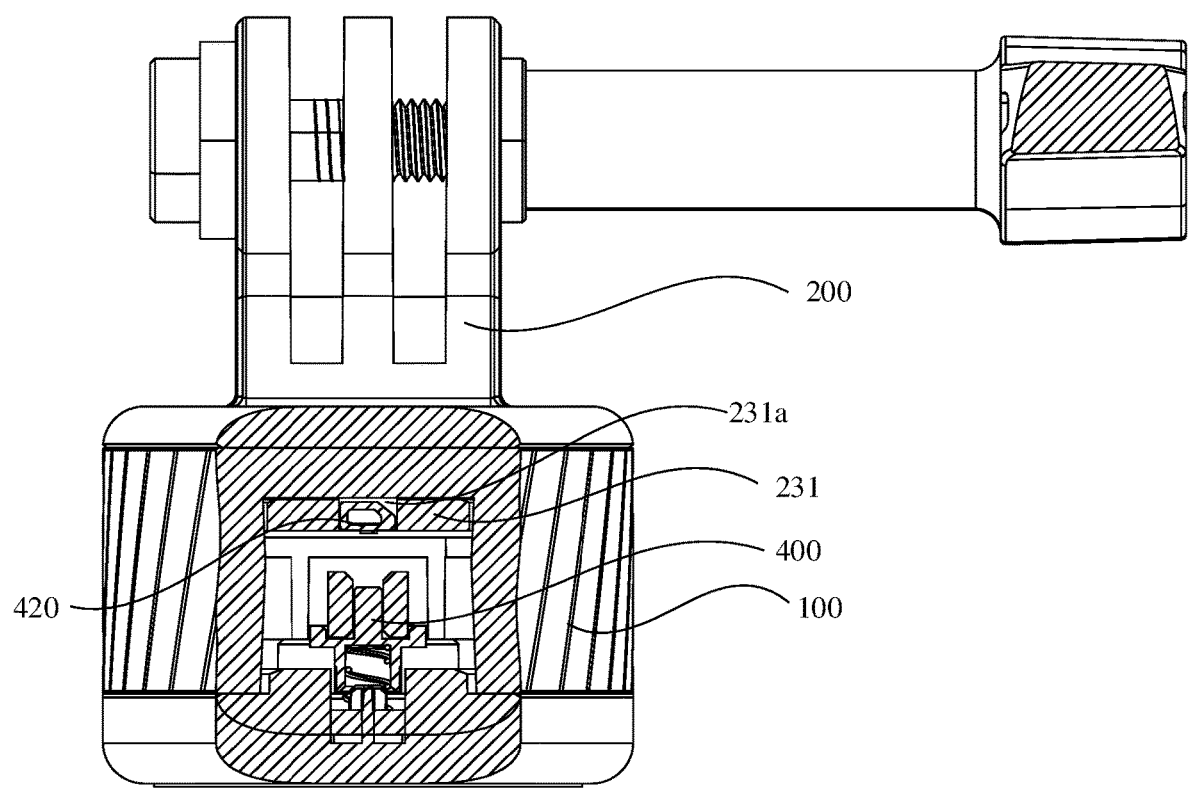
FIG. 7 is a schematic cross-sectional structural view of the switching apparatus.

In the first step, referring to FIG. 5D, the button body 410 is put into the sliding chamber C from the end of the hollow chamber, and the front ff of the button body 410 for human operation is made directly opposite the opening 1003, and button body 410 is pushed along the L2 direction, then the front ff of the button body 410 can pass through the opening 1003 to extends out of the outer wall of the connecting seat 100, where the front ff of the button body 410 is configured to contact the human finger surface. In the second step, fix the bottom of the sliding seat 430 to the chassis 1004. In the third step, as shown in FIG. 5E, align the chassis 1004 with the sliding seat 430 and the cylindrical body 1005 with the button body 410, and make the elastic buckle arm 431 of the sliding seat 430 directly opposite to the snap-fitted convex portion 411 of the button body 410. Finally, move the cylindrical body 1005 in the direction toward the chassis 1004, that is, along the L1 direction, so that the cylindrical body 1005 is cooperated with the chassis 1004 to complete the assembly. During this process, the button body 410 is in contact and snap-fitted with the sliding seat 430 in the connecting seat 100 to complete the matching assembly. The principle and the process of the cooperative assembly of the button body 410 and the sliding seat 430 can be referred to FIG. 5B and the corresponding description. The final fixation of the cylindrical body 1005 and the chassis 1004 can be bonded with screws or the glue. In the second step, refer to FIG. 5F, the chassis 1004 is provided with the mounting seat 4, one end of the reset member 440 is fixed at the bottom of the sliding seat 430, and the other end of the reset member 440 is fixed at the mounting seat 4. More specifically, the mounting seat 4 can be a clamping column, the inner ring of the spring 400 can be fixed by being snapped in the clamping column by friction, or the bottom of the sliding seat 430 can be directly and slidably connected to the mounting seat 4, so that after assembly, the sliding seat 430 can keep sliding in the sliding chamber C.

In an embodiment, the side wall of the confining convex portion 420 facing the sliding opening of the sliding clamping slot 120 is provided with a guiding inclined surface 421, and the cross-sectional area of the confining convex portion 420 tapers in the upward direction along the axis of the connecting seat 100. It can be understood when the clamping convex portion 231 slides into the sliding clamping slot 120, the clamping convex portion 231 can push against the guiding inclined surface 421 of the confining convex portion 420. With the cooperation of the guiding inclined surface 421 and the clamping convex portion 231, the confining convex portion 420 can move downward toward the axis of the connecting seat 100, thereby preventing the clamping convex portion 231 from sliding in the sliding clamping slot 120. When the confining groove 231a of the clamping convex portion 231 corresponds to the confining convex portion 420, since the clamping convex portion 231 has no force on the confining convex portion 420, the confining convex portion 420 moves upward toward the axis direction of the connecting seat 100 under the action of the reset member 440, thereby snapping into the confining groove 231a. Of course, the present application is not limited to this. In other embodiments, a guiding surface may also be provided on the side of the clamping convex portion 231 provided at the front end in the sliding direction, and the length of the clamping convex portion 231 tapers in the direction approaching the connecting seat 100.

In an embodiment, the camera fixing seat 200 is magnetically connected to the connecting seat 100. This is because the magnetic connection is convenient and quick, and does not require any precise alignment. It only relies on the magnet 500 to automatically attract, thereby saving time, and making the assembly faster. On the other hand, the connection is reliable and stable, the service life is long, the assembly method is flexible, which can increase the assembly efficiency of the camera fixing seat 200 and the connecting seat 100.

Further, the camera fixture and the connecting seat 100 are respectively provided with the magnet 500. Of course, the application is not limited to this. In other embodiments, the magnet 500 can also be assembled on the connecting seat 100 and the iron block can be assembled on the camera fixing seat 200.

Referring to FIG. 1 to FIG. 3, the bracket fixing seat 300 can be assembled on the chassis 1004. In an embodiment, the bracket fixing seat 300 is provided with a threaded hole 310, and the threaded hole 310 is configured to cooperate with the threaded column of the supporting member. In an embodiment, the bracket fixing seat 300 includes a plurality of fixing arms 320 arranged at intervals to form a plugging channel 322 between the two adjacent fixing arms 320. Each of the fixing arms 320 is provided with a corresponding fixing hole 321 for a fastener to pass through, so as to match and connected to the protrusion of the camera. Specifically, the protrusion is provided with a fastening hole, and the protrusion is inserted into the plugging channel 322. The fastener passes through the fixing hole 321 at one side, the fastening hole and the fixing hole 321 at the other side in sequence, thereby fixing the protrusion to the fixing arm 320. In an embodiment, the bracket fixing seat 300 is provided with an elastic arm 330 extending outside of the connecting seat 100. The elastic arm 330 is configured to snap with a snapping portion of the supporting member, and the snapping of the bracket fixing seat 300 is controlled by the elastic arm 330. When it needs to disassemble an accessory on the switching apparatus, gently pinch the elastic arm 330 on the bracket fixing seat 300 and push the bracket fixing seat 300 outward to remove the bracket fixing seat 300 to disassemble the accessory, which has a simple structure, is convenient to disassembly and operate, and has a relatively low production cost.

In an embodiment, the camera fixing portion 220 includes a plurality of fastening arms provided at intervals to form the plugging channel between the two adjacent fastening arms. Each of the fastening arms is provided with a corresponding fixing hole for the fastener to pass through. In order to facilitate the matching and connection with the protrusion of the camera, specifically, the protrusion is provided with the fastening hole, the protrusion is inserted into the plugging channel, and the fastener passes through the fixing hole at one side, the fastening hole and the fixing hole at the other side in sequence, thereby fixing the protrusion to the fastening arm.

The present application also provides a camera tripod, including the switching apparatus. The specific structure of the switching apparatus can be referred to the above-mentioned embodiments. Since the camera tripod adopts all the technical solutions of all the above-mentioned embodiments, it has at least all the beneficial effects brought by the technical solutions in the embodiments, which will not be repeated here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A switching apparatus, comprising:
 a connecting seat, wherein an end surface of a first end of the connecting seat is provided with a connecting slot with a circular cross-section, a part of a wall of the connecting slot protrudes toward a center of the connecting slot to form a rotating potion, and the rotating potion is provided with a sliding clamping slot along a circumferential direction of the connecting slot;
 a camera fixing seat comprising a base, a camera fixing portion and a main body fixing portion respectively provided on a front side of the base and a back side of the base, wherein the main body fixing portion is configured for inserting into the connecting slot, the camera fixing portion is configured to fix a camera, an outer peripheral surface of the main body fixing portion is provided with a clamping convex portion extending towards a peripheral surface of the main body fixing portion, after the main body fixing portion is inserted into the connecting slot, the camera fixing seat is rotated, and the clamping convex portion is configured to slide along the sliding clamping slot and is snapped in the rotating potion;
 a bracket fixing seat provided at a second end of the connecting seat; and
 a button, wherein the button comprises a button body and a confining convex portion, the confining convex portion is provided on the button body, and the button body is movably assembled on the connecting seat; after the clamping convex portion is configured to slide along the sliding clamping slot and is snapped in the rotating potion, the confining convex portion is movably snap-connected with the clamping convex portion to have a locking state and an unlocking state;
 in the locking state, the confining convex portion is snapped with the clamping convex portion to restrict the clamping convex portion from coming out; and
 in the unlocking state, the confining convex portion is separated from the clamping convex portion so that the clamping convex portion slides out of the sliding clamping slot.

2. The switching apparatus of claim 1, wherein the clamping convex portion is provided with a confining groove, in response to that the clamping convex portion is configured to slide into the sliding clamping slot until the confining groove on the clamping convex portion is rotated to a position of the confining convex portion, the confining convex portion is snapped with the confining groove.

3. The switching apparatus of claim 1, wherein the side wall of the confining convex portion facing a sliding opening of the sliding clamping slot is provided with a guiding inclined surface, and a cross-sectional area of the confining convex portion tapers in an upward direction along an axis of the connecting seat.

4. The switching apparatus of claim 1, wherein the button further comprises a sliding seat, the connecting seat comprises a chassis and a cylindrical body with a sliding chamber; the chassis is provided with a mounting seat, and the sliding seat is provided on the mounting seat, and the cylindrical body is provided with an opening for assembling the button body; and after the chassis and the cylindrical body are covered, the sliding seat is snap-connected with the button body and is slidably accommodated in the sliding chamber.

5. The switching apparatus of claim 4, wherein the sliding seat is provided with at least two elastic buckle arms, an end of each of the elastic buckle arms is provided with a barb, and a snap-fitted convex portion is provided at a back of the button body corresponding to the elastic buckle arm; and in response to that the button body is snap-connected to the sliding seat, the barb is snap-fitted to the snap-fitted convex portion.

6. The switching apparatus of claim 5, wherein two elastic buckle arms are provided directly opposite to each other, and a first gap matched with a width of the snap-fitted convex portion is provided between the two elastic buckle arms;

a second gap is provided at a middle of the snap-fitted convex portion, and the sliding seat is provided with a guiding block matched with the second gap; and in response to that the button body is connected to the sliding seat, the sliding seat is configured to slide in the sliding chamber to drive the two elastic buckle arms to move on both sides directly opposite to the snap-fitted convex portion, so that the snap-fitted convex portion enters the first gap, and the guiding block is driven to insert into the second gap.

7. The switching apparatus of claim 6, wherein a snap-fitted notch is provided on a top side of the snap-fitted convex portion, and after the barb of the elastic buckle arm is snap-fitted with the snap-fitted convex portion, the barb of the elastic buckle arm is snap-fitted with the snap-fitted notch.

8. The switching apparatus of claim 4, wherein the button further comprises a reset member, and both ends of the reset member are respectively fixed to the mounting seat of the sliding seat and the connecting seat, so that the sliding seat has a tendency to move upward toward the axis direction of the connecting seat.

9. The switching apparatus of claim 1, wherein the camera fixing seat and the connecting seat are respectively provided with a magnetic material, so that the camera fixing seat is configured to be magnetically connected to the connecting seat.

10. The switching apparatus of claim 1, wherein the bracket fixing seat is provided with a threaded hole, and the threaded hole is configured to cooperate with a threaded column of the supporting member; or the bracket fixing seat comprises a plurality of fixing arms provided at intervals to form a plugging channel between two adjacent fixing arms, and each of the fixing arms is provided with a corresponding fixing hole for a fastener to pass through; or the bracket fixing seat is provided with an elastic arm extending out of the connecting seat, and the elastic arm is configured to snap with a snapping portion of the supporting member.

11. A camera tripod, comprising the switching apparatus of claim 1.

* * * * *